United States Patent Office 3,334,135
Patented Aug. 1, 1967

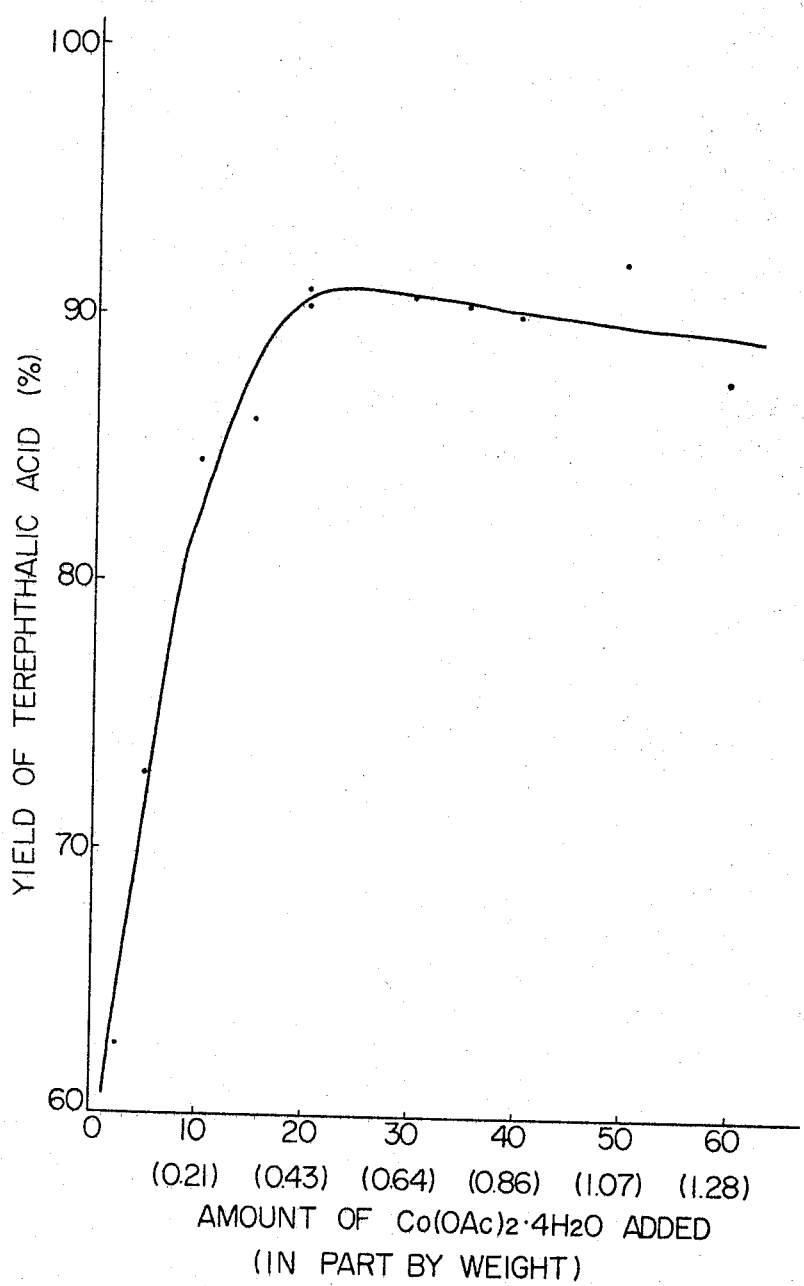

3,334,135
PROCESS FOR THE PREPARATION OF
AROMATIC CARBOXYLIC ACIDS
Yataro Ichikawa, Iwakuni-shi, Japan, assignor to Teijin
Limited, Osaka, Japan, a corporation of Japan
Filed Mar. 30, 1964, Ser. No. 355,627
Claims priority, application Japan, Apr. 2, 1963,
38/16,878
7 Claims. (Cl. 260—524)

This invention relates to a process for the preparation of aromatic carboxylic acids by reaction with molecular oxygen of a benzene derivative having at least one oxidizable group selected from a group consisting of methyl, hydroxymethyl and aldehyde, as a substituent attached to its nuclear carbon or carbons.

As the benzene derivatives used as the starting material of this invention, are those having one or more of such oxidizable groups. When they have two or more of such substituent oxidizable groups, each of them should be separated by at least one unsubstituted nuclear carbon.

The invention relates to a process for the preparation of aromatic carboxylic acids which comprises reacting benzene derivatives having such oxidizable groups as substituents with molecular oxygen such as oxygen and air in the presence of a cobalt-containing catalyst to oxidize all of the oxidizable groups of the benzene derivatives in one step.

Heretofore, for the production of aromatic monocarboxylic acids, industrial interests have been drawn to a process of oxidizing benzene derivatives having aliphatic substituents or partially oxidized products thereof in a liquid phase by means of molecular oxygen, and researches have been made on such a process.

In the majority of the cases, addition of a minor amount of a catalyst is effective for that type of oxidizing reaction. Many catalysts have been suggested for this purpose including simple substances or compounds of valency-variable metals such as cobalt, chromium, manganese, lead, iron, copper, nickel and vanadium, and simple substances or compounds of cerium, selenium, silver zinc and uranium.

Conventionally, these catalysts are used in an amount of, as a metal, $1 \times 10^{-5}$ to $1 \times 10^{-3}$ gram-atom/mol of the compound to be oxidized.

However, while with these known methods using such catalysts it is possible to produce aromatic monocarboxylic acids with relative ease, it is very difficult to produce aromatic polycarboxylic acids by one step oxidation of benzene derivatives having two or more oxidizable groups.

Thus, in accordance with the conventional methods, taking as an example the production of terephthalic acid from p-xylene, in the first step as shown in the reaction Formula (1),

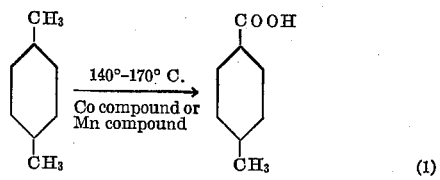
(1)

p-xylene is oxidized with air or oxygen in the presence of a cobalt compound such as, for example, cobalt naphthenate or a manganese compound such as manganese naphthenate as the catalyst to form p-toluic acid. Then the p-toluic acid is oxidized with nitric acid as shown in the Formulae (2) below, to produce terephthalic acid.

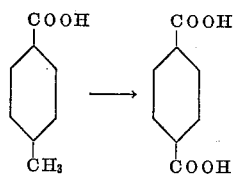
(2)

However, the production of terephthalic acid from p-xylene by two-step oxidizing reaction as above is industrially disadvantageous.

Therefore, recent attempts have been made to produce terephthalic acid by one step oxidation of p-xylene. For example, U.S. Patent No. 2,833,816 discloses an oxidizing method using as the catalyst a combination of an organic acid salt of a heavy metal such as cobalt and manganese with a bromine-containing compound such as ammonium bromide. The Journal of Organic Chemistry, Vol. 25, page 616 (1960) teaches an oxidizing method which uses ozone as a reaction initiator concurrently with an organic acid salt of cobalt as the catalyst. Again U.S. Patents Nos. 2,853,514 and 3,036,122 disclose the combination use as the catalyst of a methylene ketone such as methylethyl ketone with an organic acid salt of cobalt. Further, U.S. Patent No. 2,673,217 introduces the combination use as the catalyst of an aliphatic aldehyde with an organic acid salt of cobalt.

However all of the foregoing one-step oxidation methods have one deficiency in common, i.e., besides an organic acid salt of a heavy metal, other additives must be co-used. With the process co-using a bromide, the corrosion of the apparatus by bromide is remarkable; for the concurrent use of ozone, separate, additional apparatus for producing ozone is required; in the process co-using methylethyl ketone, the recovery of the methylethyl ketone is necessary and a portion thereof is inevitably lost; and further, the process using an aldehyde consumes a large amount of the aldehyde.

Therefore, the primary object of this invention is to provide a one-step method of producing aromatic mono- and poly-carboxylic acids by oxidation of benzene derivatives having at least one oxidizable group in the presence of a cobalt-containing catalyst alone, without addition of any of the foregoing additives.

Another object of the invention is to provide an industrially useful method for the production of aromatic carboxylic acids at high yield by oxidation of such benzene derivatives although not using any of the foregoing additives.

Still other objects and advantages of the invention will become clear from the following descriptions.

Benzene derivatives having at least one oxidizable group selected from a group consisting of methyl, hydroxymethyl and aldehyde, as a substituent attached to its nuclear carbon or carbons may be used provided that when two or more of the oxidizable groups are substituted on the nuclear carbons, each of said substituents is spaced from the next substituent or substituents by at least one unsubstituted nuclear carbon.

Examples of such benzene derivatives are: methyl-substituted aromatic compounds such as m-xylene, p-xylene, benzene derivatives having non-oxidizable substituent groups besides oxidizable methyl group such as m-toluic acid, p-toluic acid, m-methyl toluate and p-methyl toluate; hydroxymethyl-substituted benzene derivatives such as, m- and p-hydroxymethyl toluenes, and m- and p-xylylene glycols; aldehyde-substituted benzene derivatives such as benzaldehyde, m- and p-tolualdehydes, isophthaloaldehyde, m- and p-aldehyde benzoic acids and their esters.

According to the invention, a benzene derivative having at least one oxidizable group as above is reacted with molecular oxygen (a) in acetic acid having water content of not more than 15 wt. percent at the time of initiation of the reaction in an amount that the acetic acid to aromatic mol ratio is at least 6 to 1, and (b) in the presence of at least one cobalt-containing catalyst selected from the group consisting of cobalt, organic acid salts of cobalt and cobalt compounds capable of forming cobalt acetate in said acetic acid, in an amount of, on the basis of the metal cobalt, at least 0.2 gram-atom per 1 gram-mol of the benzene derivatives, (c) at the temperature ranging from 90–150° C., (d) and under the pressure of not lower than 1.5 kg./cm.$^2$ in terms of oxygen pressure, whereby all of the oxidizable groups are oxidized by one step and aromatic mono- and poly-carboxylic acids are produced at very high yields.

The catalysts and reaction conditions employed in the invention will now be explained in detail.

Catalysts

One characterizing feature of the invention resides in the discovery that the use of cobalt-containing catalyst in a large amount far exceeding the conventionally accepted range of catalyst use achieves the one-step oxidation of all of the oxidizable groups and easy production of aromatic carboxylic acid at relatively low temperatures.

As the catalyst used in the invention, not only simple compound of cobalt but also organic acid salts of cobalt and cobalt compounds which are capable of forming cobalt acetate in the solvent used in the invention can be used. As the organic acid salts of cobalt, for example, the formate, acetate, propionate, and normal- and iso-butylates may be named.

As the cobalt compounds capable of forming the acetate in the solvent of the invention, the oxides and hydroxides of cobalt are used for example.

The aforesaid organic acid salts are preferably used as a hydrous salt or salt containing water of crystallization.

Again in this invention a portion of any of the above-named catalysts may be substituted by simple substance of Pb, Ni or Ag, or an organic acid salt thereof, or a compound such as the oxide or hydroxide of any of the foregoing metals which is capable of forming an acetate in the solvent. The ratio of the Pb, Ni or Ag metal atom to the cobalt atom must not exceed 1/2.

In the invention, a cobalt-containing catalyst as above is used in an amount of, calculated as metal cobalt, at least 0.2 gram-atom per 1 gram-mol of the benzene derivatives to be oxidized.

In the past, processes of oxidizing benzene derivatives having oxidizable substitutent groups using cobalt-containing catalyst similar to those of the subject invention have been known. However in the prior known processes, the amount of use of the cobalt-containing catalyst has been far less than the case of this invention. It is an entirely novel and unexpected concept that the increased amount of the cobalt-containing catalyst would achieve the desired conversion of all of the oxidizable groups to carboxyl groups by oxidation at such relatively low temperatures as 90°–150° C.

Whereas when the cobalt-containing catalyst is used in such a ratio as, calculated as metal cobalt, at least 0.2 gram-atom per 1 gram-mol of the starting benzene derivatives as in this invention, not only all of the oxidizable groups can be converted to carboxyl groups at relatively low temperatures but the yield of aromatic carboxylic acid also increases. That is, as shown in the attached drawings, there is a close relationship between the amount of the catalyst and the yield of the aromatic carboxylic acid while of course the reaction conditions also bear some importance as will be described later. As the content of the metal cobalt in the catalyst increases from 0.05 to 0.4 gram-atom per 1 gram-mol of the benzene derivative, the yield of the aromatic carboxylic acid also rapidly increases. When the metal cobalt content of the catalyst reaches 0.2 gram-atom, the yield becomes about 80% or higher. Therefore by the use of large amount of the catalyst as in this invention, the desired carboxylic acid can be obtained at a very high yield. As can be understood from the attached drawings, the optimum range of use of the catalyst in accordance with this invention is, calculated as metal cobalt, at least 0.2, preferably 0.3 to 1.0 gram-atom, per 1 gram-mol of the benzene derivative. Although there is no generic upper limit as to the amount of the catalyst, as can be also understood from the drawings use of more than 0.4 gram-atom calculated as metal cobalt of the catalyst per 1 gram-mol of the benzene derivative does not appreciably increase the yield of the carboxylic acid, and therefore the upper limit can be determined from economic and practical considerations.

Reaction conditions

Now the reaction conditions of this invention will be explained.

We found that as well as the amount of the catalyst, the reaction conditions such as:

(1) Type and amount of solvent
(2) Reaction temperature, and
(3) Oxygen pressure, also are closely related to the rate of the oxidation reaction and the yield of the desired aromatic carboxylic acid.

In this invention, as the solvent, acetic acid having a water content at the time of initiation of the reaction not exceeding 15 wt. percent is used in an amount so that its acetic acid content should be at least 6 mols per mol of the benzene derivative. The preferred amount in this invention is, calculated as acetic acid, 10–30 mols of acid per mol of benzene derivative. Since acetic acid is the most stable acid among organic acids, it is the most preferred solvent for easy handling. Furthermore by using it in so large an amount as at least 6 times the starting material, the reaction can progress smoothly, and the one-step oxidation to the desired polycarboxylic acid can be advantageously achieved. Again by making the water content of the acetic acid at the time of initiation of the reaction a maximum 15 wt. percent, the reaction can be advantageously initiated. When the reaction is so smoothly initiated, even though the water content of the solvent later increases as water is by-produced with the progress of the reaction, the chain-reaction is not thereby interfered.

Further, while it is preferred in this invention that when an organic acid salt of cobalt is used as the catalyst it should be in the form of hydrous salt or salt containing water of crystallization, the water content of the organic acid salt catalyst in no way affects the water content of the solvent at the initiation time of the reaction as above specified.

Again, as with the other reaction conditions of this invention, it is necessary that the benzene derivative be reacted with molecular oxygen under the oxygen pressure of at least 1.5 kg./cm.$^2$, at a temperature of the range 90–150° C. In particularly preferred embodiments, the reaction is performed at 110–140° C. under an oxygen pressure of 2–50 kg./cm².

When the oxygen pressure is lower than the above-specified and/or the temperature is lower than 90° C., the reaction rate decreases to the level not industrially practicable. On the other hand, when the temperature employed is higher than 150° C., the yield of the desired product abruptly decreases.

The process of this invention may be performed in any manner, such as batchwise, intermittent, continuous or by a re-cycling system.

In practicing the process of this invention, the walls of the reaction vessel may be of any material as long as it has corrosion-resistance. It may suitably be constructed with stainless steel, for example, nickel-chromium stainless steel which contains at least one metal selected from the group consisting of molybdenum, copper, titanium, columbium and tantalum.

According to the invention, for example when p-xylene is oxidized the terephthalic acid, the yield becomes 80 (mol) percent or higher. This can be raised as high as 90% or even higher under the preferred reaction conditions. Again in case of oxidizing toluene, although the conversion ratio obtainable with the use of conventional amount of catalyst is 40–50%, with this invention substantially 100% conversion is achieved.

Thus the process of this invention is industrially advantageous in that, without addition of any of the additives as aforenamed, the oxidation can be performed at temperatures lower than the conventionally employed level by 30–50° C.

Further, the thus obtained aromatic carboxylic acid can be separated and recovered from the reaction liquid by accepted means such as solvent-distillation or filtration, in accordance with the physical property of the specific product, and further refined by purification means which are known per se.

Hereinafter the invention will be explained with reference to the examples, wherein unless otherwise specified, parts are by weight.

EXAMPLES 1–9

AISI 316 stainless steel pressure vessels each provided with a stirrer and a gas inlet at the lower part were charged with 20 parts of p-xylene (0.188 mol part), 130 parts of glacial acetic acid and the each specified amount in Table 1 of cobalt acetate ($Co(OAc)_2 \cdot 4H_2O$), and while the temperature was maintained at 120° C. and the stirrer was operated at 1200 r.p.m., under the pressure of 20 kg./cm.² g. air was passed through the vessels at the rate of, calculated as oxygen, 0.00995 mol/fed p-xylene mol/min. The reaction was continued until substantial absorption of oxygen was no longer observed (about 8 hours), and then the reaction mixtures were taken out and centrifuged to separate the solid products, composed mainly of terephthalic acid, from the mother liquid. The solid products were washed with a small amount of glacial acetic acid, dried and weighed. The results were as shown in Table 1 below. In the reaction products, substantially no remaining p-xylene was observed. This means the conversion ratio of p-xylene to terephthalic acid was 100%.

TABLE 1

| Example No. | $Co(OAc)_2 \cdot 4H_2O$ part (mol part) | $Co(OAc)_2 \cdot 4H_2O$ mol/p-xylene mol | Yield of terephthalic acid percent |
|---|---|---|---|
| 1 | 10 (0.0402) | 0.2138 | 84.5 |
| 2 | 15 (0.0603) | 0.3207 | 86.1 |
| 3 | 20 (0.084) | 0.4276 | 90.3 |
| 4 | 20 (0.084) | 0.4276 | 90.9 |
| 5 | 30 (0.1206) | 0.6414 | 90.8 |
| 6 | 35 (0.1407) | 0.7483 | 90.4 |
| 7 | 40 (0.1608) | 0.8552 | 90.0 |
| 8 | 50 (0.201) | 1.0690 | 92.0 |
| 9 | 60 (0.2412) | 1.2828 | 87.6 |
| Control No. 1 | 25 (0.01005) | 0.0535 | 62.6 |
| Control No. 2 | 5 (0.0201) | 0.1069 | 72.8 |

Based on the results of the Table 1 above, the relationship between the amount of the cobalt acetate catalyst containing 4 molecules of water of crystallization and the resultant terephthalic acid yield is shown in the attached drawing, in which the numerical values in the parentheses below the axis of abscissa show the ratio of gram-atom of metal cobalt in the cobalt acetate to 1 gram-mol of p-xylene.

EXAMPLES 10–14

In place of the cobalt acetate used in Examples 1–9, each of the specified substances in Table 2 below was employed as the catalyst in an amount of 0.08 gram-atom calculated as Co atom with the following results. Other reaction conditions were the same as in Examples 1–9.

TABLE 2

| Example No. | Catalyst | Yield of Terephthalic Acid (Percent) |
|---|---|---|
| 10 | Metal power of Co | 85.3 |
| 11 | CoO | 89.7 |
| 12 | $Co(OH)_2$ | 90.6 |
| 13 | $Co(O-\overset{O}{\underset{\|}{C}}-CH_2-CH_3) \cdot 4H_2O$ | 87.2 |
| 14 | $Co(O-\overset{O}{\underset{\|}{C}}-CH_2-CH_2-CH_3) \cdot 4H_2O$ | 86.1 |

EXAMPLES 15–19

The amount of glacial acetic acid in Examples 3 and 4 were varied as in Table 3 below with the following results. All other reaction conditions were the same as in Examples 3 and 4.

TABLE 3

| Example No. | Glacial Acetic Acid (part) | Yield of Terephthalic Acid (Percent) |
|---|---|---|
| 15 | 80 (7.08) | 73.8 |
| 16 | 100 (8.85) | 81.0 |
| 17 | 130 (11.5) | 90.6 |
| 18 | 150 (13.3) | 89.9 |
| 19 | 200 (17.7) | 87.5 |
| Control No. 3 | 60 (5.32) | 55.5 |

In column 2, the values in parentheses show the mol ratio of glacial acetic acid to p-xylene.

EXAMPLES 20–24

Examples 3 and 4 were repeated except that the partial pressure of oxygen and the temperature were varied as follows, with the results as shown in Table 4.

TABLE 4

| Example No. | Temp. (° C.) | Pressure ($O_2$ partial pressure) (aks.) | Reaction Time Required (hrs.) | Yield of Terephthalic Acid (percent) |
|---|---|---|---|---|
| 20 | 120 | 2 | 12 | 85.0 |
| 21 | 120 | 3 | 8.5 | 88.0 |
| 22 | 120 | 4 | 8.0 | 87.2 |
| 23 | 130 | 4 | 6.5 | 80.1 |
| 24 | 160 | 4 | 3 | 23.0 |
| Control No. 4 | 80 | 1 | 30 | 64.6 |
| Control No. 5 | 100 | 1 | 30 | 80.0 |

EXAMPLES 25–35

Examples 3 and 4 were repeated except that the type of catalyst was varied as in Table 5, with the following results.

TABLE 5

| Example No. | Catalyst (part) | | | | Yield of Terephthalic Acid (percent) |
|---|---|---|---|---|---|
| 25 | Co(OAc)$_2$·4H$_2$O | 35 | Ni(OAc)$_2$·4H$_2$O | 0 | 90.1 |
| 26 | Co(OAc)$_2$·4H$_2$O | 34 | Ni(OAc)$_2$·4H$_2$O | 1 | 89.1 |
| 27 | Co(OAc)$_2$·4H$_2$O | 33 | Ni(OAc)$_2$·4H$_2$O | 2 | 92.5 |
| 28 | Co(OAc)$_2$·4H$_2$O | 32 | Ni(OAc)$_2$·4H$_2$O | 3 | 87.6 |
| 29 | Co(OAc)$_2$·4H$_2$O | 31 | Ni(OAc)$_2$·4H$_2$O | 4 | 84.6 |
| 30 | Co(OAc)$_2$·4H$_2$O | 30 | Ni(OAc)$_2$·4H$_2$O | 5 | 84.8 |
| 31 | Co(OAc)$_2$·4H$_2$O | 29 | Ni(OAc)$_2$·4H$_2$O | 6 | 82.8 |
| 32 | Co(OAc)$_2$·4H$_2$O | 29 | Ni(OAc)$_2$·4H$_2$O | 8 | 86.9 |
| 33 | Co(OAc)$_2$·4H$_2$O | 25 | Ni(OAc)$_2$·4H$_2$O | 10 | 89.8 |
| 34 | Co(OAc)$_2$·4H$_2$O | 30 | Ag(OAc) | 5 | 85.1 |
| 35 | Co(OAc)$_2$·4H$_2$O | 30 | Pb(OAc)$_2$·3H$_2$O | 5 | 86.6 |
| Control No. 6 | Co(OAc)$_2$·4H$_2$O | 22.5 | Ni(OAc)$_2$·4H$_2$O | 12.5 | 67.7 |
| Control No. 7 | Co(OAc)$_2$·4H$_2$O | 20 | Ni(OAc)$_2$·4H$_2$O | 15 | 0 |

EXAMPLES 36–46

Examples 3 and 4 were repeated, and the resultant mother liquor was fractionated at 80–90° C. under reduced pressure to remove the water formed. To the remaining liquid 20 parts of p-xylene, a small amount of acetic acid, corresponding to the amount lost during the reaction, and cobalt acetate (Co(OAc)$_2$·4H$_2$O) were added. This was then recycled for use with similar oxidation reaction. This was repeated 10 times with the results as shown in Table 6.

TABLE 6

| Example No. | No. of Recycle | Yield of Terephthalic Acid (percent) |
|---|---|---|
| 36 | 0 | 90.1 |
| 37 | 1 | 87.6 |
| 38 | 2 | 93.4 |
| 39 | 3 | 88.1 |
| 40 | 4 | 85.5 |
| 41 | 5 | 85.9 |
| 42 | 6 | 85.6 |
| 43 | 7 | 84.4 |
| 44 | 8 | 85.4 |
| 45 | 9 | 85.1 |
| 46 | 10 | 85.5 |

What is claimed is:

1. Process for the preparation of a benzene dicarboxylic acid selected from the group consisting of terephthalic acid and isophthalic acid by reacting with oxygen a benzene derivative having the following formula:

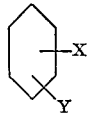

(wherein X represents a member selected from the group consisting of methyl, hydroxymethyl, and aldehyde; and Y represents a member selected from the group consisting of methyl, hydroxymethyl, aldehyde, carboxyl and carbomethoxy, said groups X and Y being spaced from at least one unsubstituted nuclear carbon) in a solvent in the presence of cobalt or a cobalt-containing catalyst which is characterized in that as the solvent acetic acid of which the water content is no more than 15% by weight at the initiation time of the reaction is used in an amount, calculated as pure acetic acid, of at least 6 mol times the said benzene derivative and the benzene derivative is reacted with molecular oxygen at the temperature of 90–150° C. and the pressure of at least 1.5 kg./cm.$^2$ calculated as oxygen pressure, in the presence of at least one cobalt-containing catalyst selected from the group consisting of cobalt, organic acid salts of cobalt and cobalt compounds which are capable of forming cobalt acetate in said solvent, in an amount of at least 0.2 gram-atom, calculated as metal cobalt, per 1 gram-mol of the benzene derivative.

2. The process of claim 1 in which the reaction is performed at the temperature of 110–140° C.

3. The process of claim 1 in which the reaction is performed at the pressure of 2–50 kg./cm.$^2$ calculated as oxygen pressure.

4. The process of claim 1 in which air is used as the molecular oxygen.

5. The process of claim 1 in which as the cobalt-containing catalyst, at least one metal or metallic compound selected from the group consisting of metal cobalt, organic acid salts thereof, oxides thereof and hydroxides thereof is used.

6. The process of claim 1 in which as the cobalt-containing catalyst, a hydrous organic acid salt of cobalt or organic acid salt of cobalt having water of crystallization is used.

7. The process of claim 1 in which para-xylene is used as the aromatic compound to form terephthalic acid.

References Cited

UNITED STATES PATENTS 3,030,413  4/1962  Taves _____ 260—524
3,036,122  5/1962  Ardis et al. _____ 260—524

FOREIGN PATENTS 615,363  2/1961  Canada.
774,902  5/1957  Great Britain.

RICHARD K. JACKSON, *Primary Examiner.*

S. WILLIAMS, *Assistant Examiner.*